No. 727,941. PATENTED MAY 12, 1903.
J. F. HARRIGAN.
JOURNAL BEARING.
APPLICATION FILED SEPT. 4, 1902.
NO MODEL. 2 SHEETS—SHEET 1.
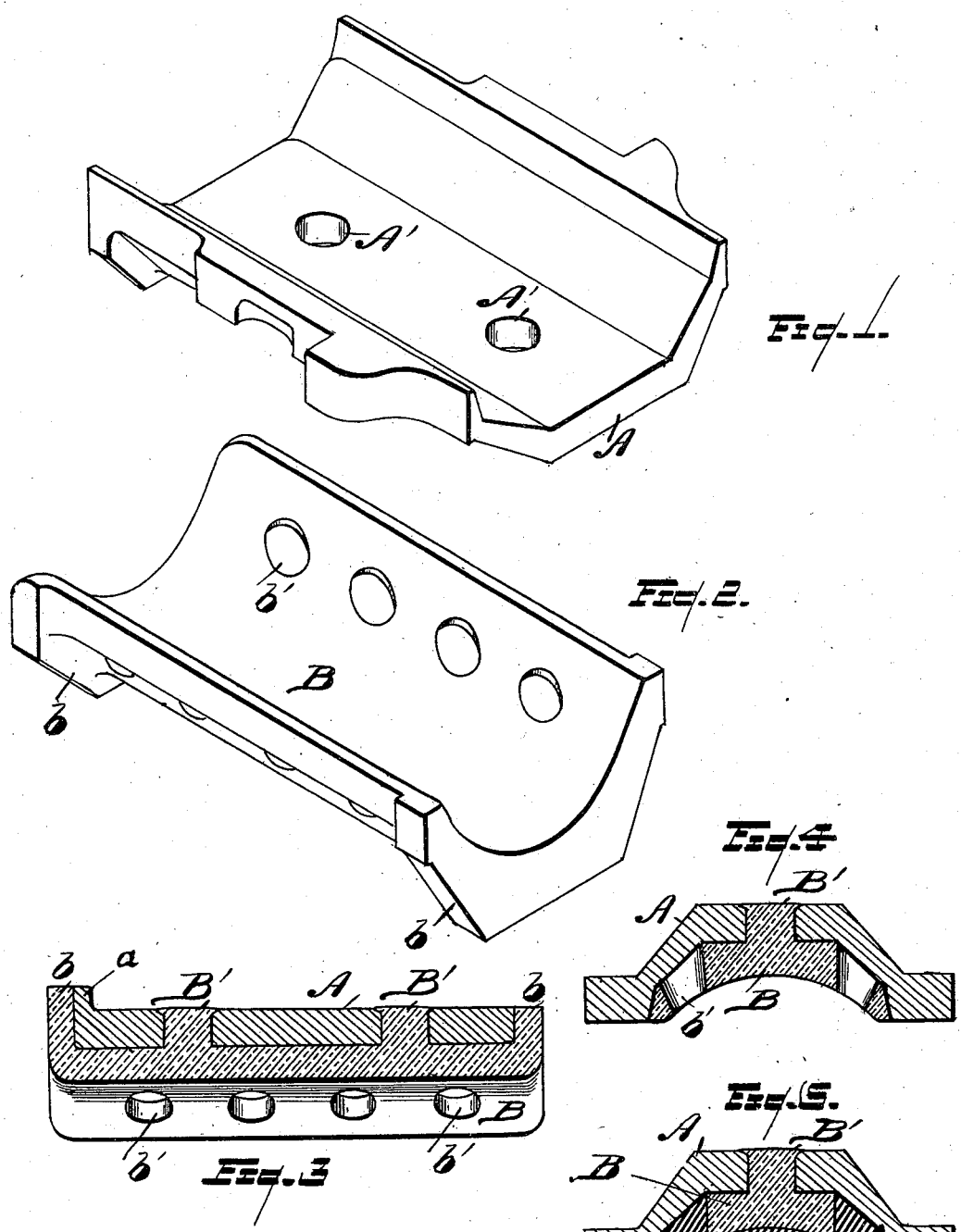

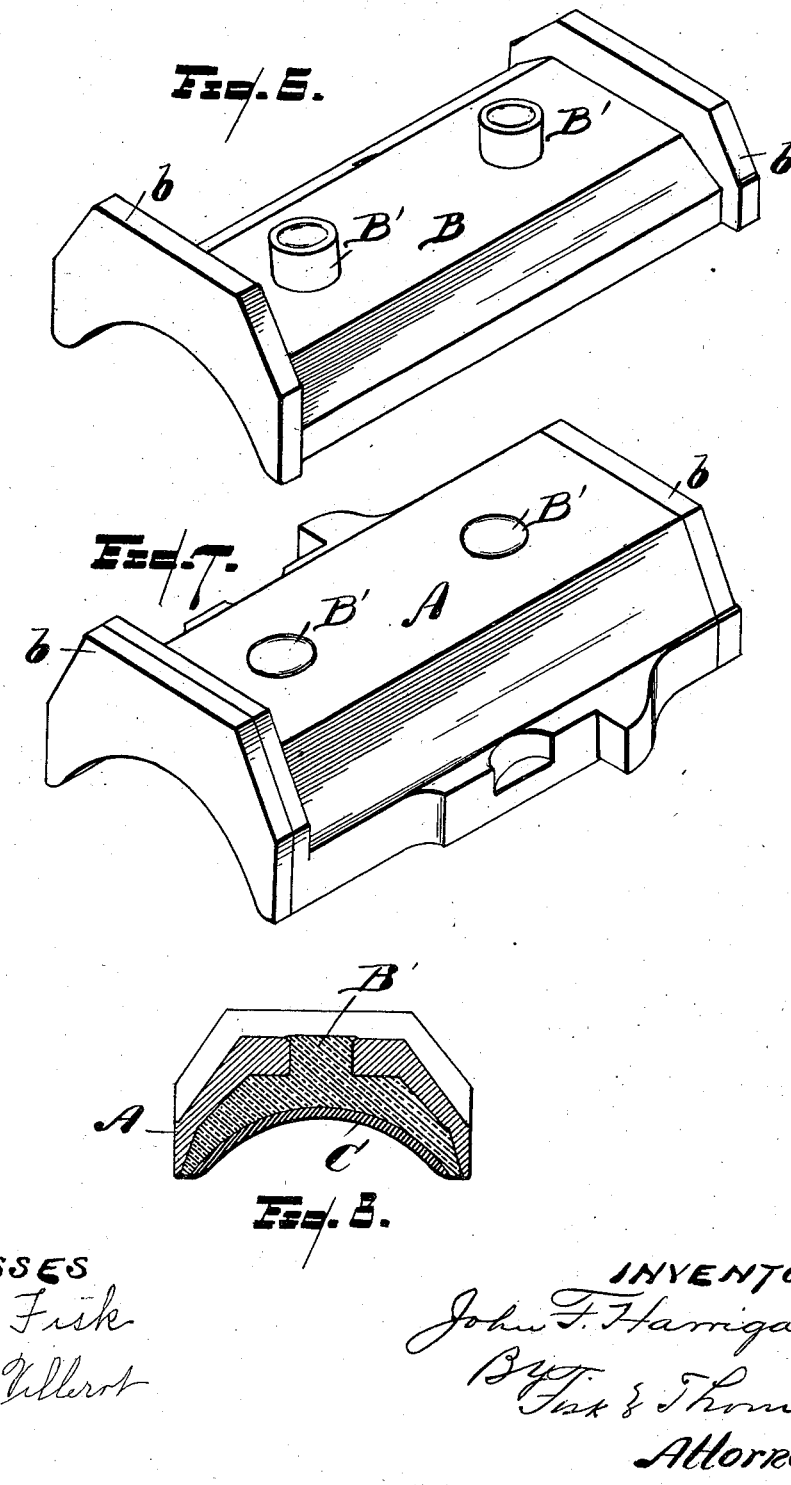

No. 727,941. Patented May 12, 1903.

UNITED STATES PATENT OFFICE.

JOHN F. HARRIGAN, OF DETROIT, MICHIGAN.

JOURNAL-BEARING.

SPECIFICATION forming part of Letters Patent No. 727,941, dated May 12, 1903.

Application filed September 4, 1902. Serial No. 122,040. (No model.)

*To all whom it may concern:*

Be it known that I, JOHN F. HARRIGAN, a citizen of the United States, residing at Detroit, in the county of Wayne and State of Michigan, have invented certain new and useful Improvements in Journal-Bearings, of which I do declare the following to be a full, clear, and exact description, reference being had to the accompanying drawings, forming part of this specification.

The present invention has relation more particularly to that class of journal-bearings designed for use with car and locomotive axles; and the object of the invention is to provide a more simple, cheap, and effective construction of journal-bearing than any now upon the market.

In the manufacture of car-axle journal-bearings it has heretofore been recognized as a desirable feature that the bearings should be formed of separable parts, the outer part or back being usually made of a cheap durable metal, such as malleable iron and the like, while the inner portion of the bearing is made of brass or like composite metal. In practice it has also been found desirable that the brass bearing portion should have its wearing-face lined with a thick coating of Babbitt metal, as by this means an injurious heating of the bearing is most effectively avoided. One advantage incident to the use of journal-bearings formed with backs or shells with brass inner sections detachably connected thereto is that when the Babbitt lining of the brass section becomes worn away the brass section can be readily removed in order that it may be relined. So, also, another advantage of such style of bearing is that if the Babbitt metal be worn away the brass portion of the bearing will afford an effective wearing-surface for the journal until the relining of the bearing may be had or, indeed, until the brass portion is practically exhausted.

While it has been heretofore proposed to form journal-bearings of separate sections, as above described, none of these prior constructions have embraced the desirable features that characterize the present invention. With my improved construction of journal-bearing not only is a more effective provision made for holding the brass bearing-section in secure relation with respect to the iron back, but the relative construction of the parts is such that all danger of the contact of the back portion of the bearing with the flange or shoulder of the journal is avoided.

The invention consists in the features of novelty hereinafter described, and particularly defined in the claims at the end of this specification.

Figure 1 is a perspective view showing the inside of the bearing back or shell. Fig. 2 is a similar view of the "brass" or bearing proper. Fig. 3 is a view in vertical longitudinal section, showing the brass or bearing proper attached to the back. Fig. 4 is a view in cross-section of the part shown in Fig. 3. Fig. 5 is a view in cross-section, similar to Fig. 4, but with the Babbitt-metal lining applied to the brass. Fig. 6 is a perspective view of the brass or bearing proper, but showing the same somewhat modified. Fig. 7 is a perspective view showing the brass or bearing proper and its back or shell assembled. Fig. 8 is a cross-sectional view of the parts shown in Fig. 7.

A designates the back or shell of the journal-bearing, and B denotes the brass or bearing proper. The inner surface of the shell or back A is formed with polygonal faces, and the outer surface of the brass or bearing proper, B, is similarly shaped and adapted to bear snugly against the corresponding faces of the back or shell A. The brass B extends downward and completely covers the inner face of the back A, thereby protecting such face against contact with the journal at all points. Preferably the back or shell A is formed with holes A', adapted to receive the lugs B', projecting upward from the top of the brass or bearing proper, B. If desired, the lugs B' may have their ends upset or riveted, as shown, although this is not essential. Indeed, it is not essential that the brass shall be provided with the lugs B', since the contacting polygonal faces of the shell and brass securely retain the parts in position against lateral movement. The ends of the brass B are upturned, as clearly shown in Figs. 3 and 7, to receive and bear against the ends of the back or shell A, and by thus completely covering the ends of the back A all danger of the contact of the back with the flange or shoulder of the car-axle is avoided.

Preferably the back A is formed at one end with the upwardly-extending flange a, that serves to brace the corresponding adjacent flange b of the brass.

The brass or bearing proper, B, has a lining C, of Babbitt metal or like soft antifriction metal applied thereto, and preferably, although not essentially, the brass B will be formed with dovetailed holes b', into which the Babbitt metal will be run, these dovetailed holes serving to securely lock the Babbitt-metal lining in position. It is not essential, however, that the brass B shall be provided with holes or apertures b', and in the form of the invention illustrated in Figs. 6 and 8 the Babbitt-metal lining C is shown as attached to the brass in the usual manner, the holes b' being omitted.

From the foregoing description it will be seen that when the brass B is set in position with respect to the back or shell A not only is the entire inner face of the shell protected against wear, but the ends of the shell are completely covered and protected by the flanges b of the brass, so that all danger of contact of the flange or shoulder of the axle-journal with the ends of the back is avoided. Moreover, inasmuch as the polygonal upper surface of the brass B conforms to the polygonal inner face of the back or shell A the tendency of the brass B to turn with the axle-journal is avoided, it being understood, of course, that the weight of the car upon the back A holds the brass firmly against the surface of the journal. Hence but little strain is thrown upon the lugs B', and these lugs may be omitted altogether, if desired. Indeed, by thus forming the contacting face of the detachable parts of polygonal outline the rigidity of the bearing is greatly increased without detracting from the ease with which the parts may be separated. When the lining C is worn away, the brass B will take the wear of the journal, and when the bearing is to be relined the brass B, if not worn excessively, may have a fresh lining C applied thereto, or if the brass B be worn excessively it may be removed and a new brass substituted therefor; but inasmuch as the back or shell A is completely protected against wear at its ends, as well as at other points, it will be readily seen that the same back may be used over and over again with new or relined brasses, and even when the lining has been worn away it will be found with my improved bearings that the brass presents as full and uniform contact surface for the journal, its shoulder and flange as is found in solid bearings of brass.

Having thus described my invention, what I claim as new, and desire to secure by Letters Patent, is—

1. A journal-bearing consisting of a back A and a detachable brass B, said brass extending downward to the lower edges of the back at its sides and having at its ends vertically-extending flanges that completely cover the ends of the back, said brass being provided with a lining of antifriction metal fixed thereto and insertible with the brass into the back.

2. A journal-bearing consisting of a back A and a detachable brass B, said brass extending downward to the lower edges of the back and having at its ends vertically-extending flanges that cover the ends of the back, the adjoining faces of both said brass and said back being of polygonal outline and said brass being provided with a lining of antifriction metal fixed to the brass and insertible into the back with the brass.

In testimony whereof I sign this specification in the presence of two witnesses.

JOHN F. HARRIGAN.

Wittnesses:
S. E. THOMAS,
HENRY E. VILLEROT.